United States Patent [19]

Toh

[11] Patent Number: 5,786,018

[45] Date of Patent: Jul. 28, 1998

[54] PREPARATION OF INSTANT RICE NOODLES

[75] Inventor: Tian Seng Toh, Singapore, Singapore

[73] Assignee: Nestec S.A., Vevey, Switzerland

[21] Appl. No.: 635,019

[22] Filed: Apr. 19, 1996

[30] Foreign Application Priority Data

Apr. 22, 1995 [SG] Singapore ............... 9500311-7

[51] Int. Cl.⁶ ............................................. A23L 1/16
[52] U.S. Cl. .................... 426/557; 426/451; 426/508; 426/516
[58] Field of Search ........................... 426/451, 557, 426/575, 577, 508, 510, 511, 516

[56] References Cited

U.S. PATENT DOCUMENTS

| | | |
|---|---|---|
| 3,537,862 | 11/1970 | Peters et al. . |
| 3,836,680 | 9/1974 | Salza . |
| 4,243,690 | 1/1981 | Murakami et al. . |
| 4,325,976 | 4/1982 | Harrow et al. . |
| 4,435,435 | 3/1984 | Hsu . |
| 4,544,563 | 10/1985 | Lechthaler . |
| 4,769,251 | 9/1988 | Wenger et al. . |
| 5,211,977 | 5/1993 | Hauser et al. . |
| 5,256,435 | 10/1993 | Cuperus . |

*Primary Examiner*—Lien Tran
*Attorney, Agent, or Firm*—Vogt & O'Donnell, LLP

[57] ABSTRACT

Instant rice noodles are prepared by preparing first a rice flour in which its starch is gelatinized partially, and then, the flour is mixed with water at a temperature and for a time to form a dough and to gelatinize the starch further, but not completely, the dough is extruded to obtain the dough in a form of noodles, the noodles are steamed to firm them, the firmed noodles are blanched with water at a temperature and for a time to gelatinize the starch further, and then, the blanched noodles are dried to a moisture content to below 15% by weight. When rice flour is employed as a starting material, it first is steamed for preparing the rice flour in which the starch is gelatinized partially, and when whole rice is employed as a starting material, the whole rice is steamed to gelatinize its starch partially and then, the rice is milled for obtaining the rice flour in which the starch is gelatinized partially.

18 Claims, No Drawings

PREPARATION OF INSTANT RICE NOODLES

FIELD OF THE INVENTION

The present invention relates to a process for the preparation of rice noodles, more particularly instant rice noodles.

BACKGROUND OF THE INVENTION

The domestic and small-scale production of rice noodles has long been widespread in Eastern rice-producing countries. The processes which are used vary from one region or from one country to another, but they are all based on a small number of basic operations which are linked and/or repeated as dictated by the local traditions and also as a function of the particular qualities of the local types of rice. The fundamental problem is to confer to the rice dough the cohesion which it lacks. The low protein content of the rice, on the one hand, and the very nature of these proteins, on the other hand, mean that it is impossible to produce a network with rice which is comparable to that formed by wheat gluten in such products as bread or pasta. In order to replace this network in which the starch grains are embedded, it is necessary to either use binders, or to subject the starch grains to treatments, so that they are capable on their own of forming a mass having the necessary cohesion. These problems of cohesion are re-encountered at the stage of working the fresh pasta dough as well as at the stage of the reconstitution and consumption of the final product.

Conventional and typical basic operations may include for example soaking the grains of rice, wet milling, pre- and post-gelatinisation, cooling and mechanical working of the dough, and a typical, conventional process includes the successive stages of soaking a ground rice over a period of several hours, e.g. 4–6 hours, pre-gelatinisation, cooling, extrusion, post-gelatinisation and drying. Mentioned as conventional binders which have been proposed are egg proteins, soluble proteins of whey, or wheat gluten, for example, and processes are known in which ground rice is combined with wheat flour, which is not obvious, because if ground rice mixed with wheat flour is pregelatinised, the wheat gluten is denatured and it is no longer possible to shape the dough.

European patent Application Publication 0 105 100 describes a process for the production of rice pasta including gelatinisation, extrusion and drying, which comprises mixing a rice flour in a cooker-extruder with soft water and an ionic gelling agent such as an alginate to obtain a dough containing from 35 to 55 % of water, gelatinising the dough by heating and kneading under a pressure of from 70 to 100 bar at a temperature of from 60° to 100° C. over a period of 20 to 120 seconds, cooling the dough to a temperature below 100° C., extruding it in the form of pasta, bringing the pasta into contact with water containing a cation such as divalent calcium which forms a gel with the ionic gelling agent, and drying the pasta.

In the process of European Patent Application Publication 0 105100, the cation is used to set the ionic gelling agent which forms a network in a similar way to gluten and confers to the rice dough the cohesion that it lacks.

SUMMARY OF THE INVENTION

The present invention provides a process for the preparation of instant rice noodles in which a cooker-extruder is not required, the rice does not require soaking for several hours before pre-gelatinisation, and the process can be carried out in the substantial or complete absence of an ionic gelling agent and of a cation which forms a gel with the ionic gelling agent.

According to the present invention there is provided a process for the production of instant rice noodles which comprises a) steaming rice to partially gelatinise the starch and to form a pretreated rice flour b) mixing the pretreated rice flour, with hot water to obtain a dough, c) extruding the dough to form the noodles d) steaming the noodles, e) blanching the steamed noodles, in hot water, and f) drying the noodles to a moisture content below 15% by weight.

DETAILED DESCRIPTION OF THE INVENTION

In carrying out the present invention, the rice that is used may be rice flour or whole rice. Preferably, the rice used is a long grain rice with a high amylose content, e.g. containing from 21 to 28% and preferably from 22 to 27% amylose by weight.

The steaming of the rice should pregelatinise some, but not all, of the starch, e.g. from 20% to 90%, preferably from 60% to 80%. This partial pregelatinisation provides an increase in the water binding capacity of rice flour during dough preparation and reduces the stickiness of the dough during extrusion.

The steaming treatment may be carried out over a period of from 10 minutes to 1 hour and preferably from 20 to 45 minutes. The temperature of the steam may be from 85° to 100° C. and preferably from 90° to 100° C. The steaming treatment is preferably carried out in a screw-steam blancher to make the pretreatment more continuous in which the rice is steamed in the jacketed housing while being transported along the screw conveyor. Immediately after steaming, the rice has an increase of from about 3–6% moisture, usually from 4–5% by weight.

If desired, the rice may be presoaked in excess water, e.g. for up to 1 hour, preferably from 15 to 45 minutes, before steaming. The amount of water used is advantageously at least 0.8 parts by weight per part by weight of rice.

When whole rice is used as the starting material, the steaming treatment the rice is milled and sifted to give a pretreated rice flour. The milling and sifting may be carried out by conventional means. For example, the mill used may have a screen opening size of from 0.25 to 0.75 mm, for instance from 0.3 to 0.6 mm. The sifting may be carried out by a centrifugal sifter. If rice flour is used as the starting material, milling is not necessary but sifting may be carried out to eliminate any coarse particles which could block the die holes during extrusion.

After milling and sifting, the moisture content of the pretreated rice flour is usually from 10 to 15% by weight.

The average particle size of the pretreated rice flour after milling and sifting may vary from about 0.1 mm to 0.5 mm depending on the screen opening size of the mill. Within this range, rice noodles made from rice flour having a finer particle size are firmer in bite and smoother in mouthfeel, whereas rice noodles made from rice flour having a larger particle size are shorter in bite, rougher in mouthfeel and are more raw in taste.

The pretreated rice flour is advantageously mixed with a minor amount of a starch such as potato starch or corn starch before being made into a dough to give a smoother mouthfeel to the noodle. The amount of the starch may be from 5 to 30% by weight and preferably from 10 to 25% by weight based on the total weight of the mixture. Advantageously, a small amount of an ionic gelling agent such as an alginate, e.g propylene glycol alginate may be added for the dough preparation. The amounts added may be from 0.01 to 0.5%, preferably from 0.025 to 0.25% and especially from 0.05 to 0.15% by weight based on the weight of the rice flour. The ionic gelling agent may be premixed with the rice flour or predissolved in hot water before the pretreated rice flour is mixed with the hot water to form the dough.

The amount of hot water added to the pretreated rice flour mixture may be from 25 to 65% by weight, preferably from 30 to 60% by weight and more preferably from 35 to 55% by weight based on the total weight of the dough formed. The temperature of the hot water may be from 80° C. to boiling, preferably from 85° to 100° C. and especially from 90° to 95° C. The duration of the mixing of the hot water with the pretreated rice flour mixture may be, for example, from 1 to 20 minutes, preferably from 1.5 to 10 minutes and more preferably from 2 to 5 minutes. The use of hot water further gelatinises the starch by from 5% to 30% in order to enhance the binding of the dough for better subsequent extrusion. It should be understood that the starch should not become completely gelatinised, otherwise the dough would become lumpy and difficult to extrude continuously and consistently.

The extrusion of the dough to form the noodle may be carried out in a ram extruder or a double screw extruder but is preferably carried out in a single screw extruder.

The diameter of the nozzle may be, for example, from 0.25 to 1.5 mm and preferably from 0.5 to 1.0 mm and especially from 0.6 to 0.9 mm. The use of a nozzle with a larger diameter enables a better processability because a lower extrusion pressure can be used and there is thus less back flow, less shearing and a higher capacity.

Preferably, after extrusion, the noodle is portioned and formed into a nest or cake. The portioning involves cutting the noodle into strips or strands having a length of from about 7 cm to 50 cm, preferably from 20 to 40 cm. The portioned strands may be formed into a nest by folding and intertwining a plurality of strands into either a roughly spherical shape sowewhat similar to a bird's nest or into a roughly square shape to form a cake. The formation of a nest or cake may be carried out in a perforated tray. The weight of the nest or cake may be from 15 to 100 g, more usually from 20 to 80 g, for example from 25 to 65 g. The volume of the nest or cake may be from about 50 cm$^3$ to about 270 cm$^3$.

The steaming of the noodles is performed to firm up the surface and structure and may be carried out for a period of from 5 to 75 minutes, preferably from 20 to 70 minutes and especially from 30 to 60 minutes. The temperature of the steam may be from 85° to 100° C. and preferably from 90° to 100° C. Saturated steam or steam at atmospheric condition may conveniently be used, if desired.

We have found that shorter steaming times, particularly from 5 to 20 minutes, lead to weaker noodle strands which may break upon rehydration. However, when the rice is presoaked in water before steaming or an ionic gelling agent is added to the dough, this disadvantage is avoided.

The blanching of the steamed noodles is carried out to complete or substantially complete the starch gelatinisation. The temperature of the hot water may be from 80° C. to boiling, preferably from 85° to 100° C. and especially from 90° to 98° C. The duration of the blanching may be from 1 to 60 seconds, preferably from 5 to 45 seconds and more preferably from 10 to 30 seconds.

In the absence of a blanching step, the rehydrated rice noodles are raw in taste and the noodle strands tend to stick together.

After blanching, excess water may be drained away, e.g. by sieving, vibrating or air blowing.

Finally, the noodles are dried to give instant rice noodles, preferably to a moisture content of from 3 to 13% by weight, e.g. from 5 to 10% by weight. Although the drying may be carried out by any conventional method, moderate drying conditions are preferred to avoid cracking of the noodle strands after drying. Although a temperature from 50° to 80° C. for a period of from 30 minutes to 5 hours may be suitable, it has been found that lower drying temperatures in humid conditions lead to a better product. The temperature is preferably from 50° to 70° C., more preferably from 55° to 65° C. and especially from 55° to 60° C. The relative humidity is preferably from 20 to 50%, more preferably from 25 to 40% and especially from 30 to 35%. The duration of the drying is preferably from 1 to 3 hours and more preferably from 1.5 to 2.5 hours.

The instant rice noodles prepared according to this invention may be reconstituted for consumption by placing in boiling water and soaking with the heat turned off or continuing to boil for from 0.5 to 5 minutes, preferably from 1 to 3 minutes. They may also be reconstituted for consumption by adding an appropriate amount of water, e.g. boiling water and heating at high power from 1 to 4 minutes, preferably from 2 to 3 minutes or cold tap water at 20° to 25° C. and heating in a microwave oven, e.g. at high power from 2 to 5 minutes, preferably from 3 to 4 minutes. Shorter reconstitution times within the above range may be used for thinner noodles.

The solid losses of the reconstituted noodle are acceptable, e.g. from 0.7 to 2.5%, but it has been found that the solid losses during reconstitution can be reduced and a firmer bite may be obtained by using rice which has been presoaked in excess water for up to 1 hour before steaming or by adding an ionic gelling agent to the dough as described above.

EXAMPLES

The following Examples further illustrate the present invention.

Example 1

Long grain rice having an amylose content of 23% by weight and a moisture content of 13% by weight is steamed at 100° C. in a screw-steam blancher for 30 minutes at a rate of 1.5 kg per minute after which the moisture content increases by 5% and the degree of gelatinisation is 22.5%. The pretreated rice is then milled in a Fitz Mill (a comminuting machine made by the Fitzpatrick Company with the cutting blades rotating at 4600 rpm) having a screen opening size of 0.31 mm and sifted to give a rice flour having a moisture content of 11%, 60.3% of which has a particle size between 0.150 and 0.315 mm and 39.0% of which has a particle size of less than 0.150 mm.

The pretreated rice flour is mixed with corn starch in a 4:1 ratio and prepared into a dough with a 60% solids content by mixing with water at 90° C. for 3 minutes in a Stephan mixer (Model : UM 40 E-GNI) which is a vertical single shaft mixer with the shaft turning at 3000 rpm. The temperature of the dough after mixing is 65° C.

The dough is extruded into noodle strands through a single screw extruder at 50 bar pressure whose die nozzle diameter is 0.7 mm. The noodle strands are cut into 30 cm length and then a plurality of strands are folded and intertwined to form a nest having a weight of 50 g and a volume of 270 cm$^3$.

The nest is steamed with saturated steam for 30 minutes and then blanched in water at 90° C. for 20 seconds to complete the gelatinisation of the starch. The blanched nest containing 51% moisture is drained of excess water by sieving and then dried in a hot air oven for 2 hours at a temperature of 55° to 60° C. and at a relative humidity of 30 to 35% to give the instant rice noodles having a moisture content of 8% by weight.

On reconstitution for consumption by boiling in water for 1 minute (cooking method), the instant noodles have a firm and clean bite, slightly rough texture, good texture folding, a long strand and slight leaching.

On reconstitution for consumption by soaking in boiling water in a covered vessel for 2 minutes (soaking method), the instant noodles have a firm, clean and rubbery bite, slightly rough texture, good texture holding, long strand and no leaching.

Example 2

A similar procedure to that described in Example 1 was followed except that 0.1% by weight of propylene glycol alginate, based on the weight of the pretreated rice flour, is added to the dough and steaming of the nest is carried out for only 10 minutes.

On reconstitution for consumption by both the cooking and soaking methods, the instant rice noodles have similar properties to those of Example 1.

Example 3

A similar procedure to that described in Example 1 is followed except that rice flour is used instead of long grain rice and the milling step is eliminated.

On reconstitution for consumption by both the cooking and soaking methods, the instant rice noodles have similar properties to those of Example 1.

Example 4

A similar procedure to that described in Example 1 is followed except that the long grain rice is presoaked for 30 minutes, drained, and then steamed for 10 minutes instead of 30 minutes in the screw-steam blancher at a rate of 2.3 kg per minute to give a degree of gelatinisation of 87.9%.

On reconstitution for consumption by the cooking method, the instant rice noodles have a firm clean and bouncy bite, smooth mouthfeel, good texture holding, long strand and slight leaching.

On reconstitution for consumption by the soaking method, the instant rice noodles have a firm, clean, bouncy and slightly rubbery bite, smooth mouthfeel, good texture holding, long strand and no leaching.

Comparative Example A

A similar procedure to that described in Example 1 was followed except that the blanching step was omitted. When the noodles were reconstituted for consumption, they were very sticky and had a raw taste.

I claim:
1. A process for preparing rice noodles comprising:
   steaming whole rice so that from 20% to 90% of its starch is gelatinized to obtain a whole rice product which comprises partially gelatinized rice starch;
   milling the whole rice product to obtain a flour product;
   mixing the flour product with water at a temperature and for a time to form a dough and to gelatinize the rice product starch from 5% to 30% further to obtain a dough in which the starch is not gelantinized completely and extruding the dough to obtain the dough in a form of noodles;
   steaming the noodles, at a temperature and for a time sufficient to firm the noodles to obtain firmed noodles;
   blanching the firmed noodles with water at a temperature and for a time to obtain blanched noodles so that at least substantially all the blanched noodle starch is gelatinized; and
   drying the blanched noodles to a moisture content of below 15% by weight.
2. A process for preparing rice noodles comprising:
   steaming rice flour so that from 20% to 90% of its starch is gelatinized to obtain a flour product which comprises partially gelatinized rice starch;
   mixing the flour product with water at a temperature and for a time to form a dough and to gelatinize the flour starch from 5% to 30% further to obtain a dough in which the starch is not gelantinized completely and extruding the dough to obtain the dough in a form of noodles;
   steaming the noodles at a temperature and for a time sufficient to firm the noodles to obtain firmed noodles;
   blanching the firmed noodles with water at a temperature and for a time to obtain blanched noodles so that at least substantially all the blanched noodle starch is gelatinized; and
   drying the blanched noodles to a moisture content of below 15% by weight.
3. A process according to claim 1 wherein the whole rice is steamed so that from 60% to 80% of its starch is gelatinized.
4. A process according to claim 2 wherein the rice flour is steamed so that from 60% to 80% of its starch is gelatinized.
5. A process according to claim 1 or 2 wherein the firmed noodles are blanched at a temperature of from 80° C. to 100° C. for a time of from 1 second to 60 seconds.
6. A process according to claim 1 or 2 wherein the noodles are steamed at a temperature of from 85° C. to 100° C. for a time of from 5 minutes to 75 minutes.
7. A process according to claim 1 or 2 wherein the noodles are steamed at a temperature of from 85° C. to 100° C. for a time of from 20 minutes to 70 minutes.
8. A process according to claim 1 further comprising, prior to steaming the whole rice, soaking the whole rice in water.
9. A process according to claim 8 wherein the noodles are steamed at a temperature of from 85° C. to 100° C. for a time of from 5 minutes to 75 minutes.
10. A process according to claim 1 or 2 further comprising mixing an ionic gelling agent with the flour product and water to form the dough.
11. A process according to claim 10 wherein the noodles are steamed at a temperature of from 85° C. to 100° C. for a time of from 5 minutes to 75 minutes.
12. A process according to claim 1 or 2 further comprising mixing the flour product with a starch product selected from the group consisting of corn starch and potato starch and mixing with the water to form the dough.

13. A process according to claim 12 wherein the starch product is mixed in an amount so that the dough contains the starch product in an amount of from 5% to 30% by weight based upon dough weight.

14. A process according to claim 1 wherein the whole rice is a long grain rice which comprises, by weight, from 21% to 28% amylose.

15. A process according to claim 2 wherein the rice flour is a long grain rice flour which comprises, by weight, from 21% to 28% amylose.

16. A process according to claim 1 or 2 wherein the noodles are steamed at a temperature of from 85° C. to 100° C. for from 5 minutes to 75 minutes and the noodles are blanched at a temperature of from 85° C. to 100° C. for from 1 second to 60 seconds.

17. A process according to claim 1 or 2 further comprising, prior to steaming the noodles, forming the noodles into a nest and then steaming the nest noodles.

18. A process according to claim 1 or 2 further comprising, prior to steaming the noodles, forming the noodles into a cake and then steaming the cake noodles.

* * * * *